G. VINCON.
BALL BEARING.
APPLICATION FILED FEB. 16, 1909.

1,020,729.

Patented Mar. 19, 1912.

Witnesses
Edmund D. Dubocq
Geo. N. Kerr

Inventor
Gustavo Vincon,
By his Attorneys
Edwards, Sager & Wooster.

UNITED STATES PATENT OFFICE.

GUSTAVO VINCON, OF TURIN, ITALY.

BALL-BEARING.

1,020,729.

Specification of Letters Patent. Patented Mar. 19, 1912.

Application filed February 16, 1909. Serial No. 478,145.

*To all whom it may concern:*

Be it known that I, GUSTAVO VINCON, a subject of the King of Italy, residing at Turin, in the Province of Piedmont, and Kingdom of Italy, have invented certain new and useful Improvements in Ball-Bearings, of which the following is a full, clear, and exact specification.

This invention relates to ball bearings, and has particular reference to ball bearings of the type wherein the balls are supported by means of a spacing ring; and has for its objects to provide a spacing ring construction wherein a cavity will be formed adapted to contain a lubricant, and also to a construction of spacing ring which shall be removable from the bearing without disturbing the balls.

As particularly shown herein, the invention comprises concentric rings having notches adapted to register to permit insertion of the balls, which when inserted lock the rings against separation, together with a spacing ring preferably formed of two U-shaped or channel sections having notches for the balls and secured together by screws and nuts passing through both rings between the balls. Such a ball bearing will be cheaply constructed, can be readily disassembled and will, by reason of the large quantity of grease capable of being retained by the hollow spacing ring, run for a long period of time without deterioration or excessive friction.

The invention will be more fully understood in connection with the description of the accompanying drawings, wherein—

Figure 1:
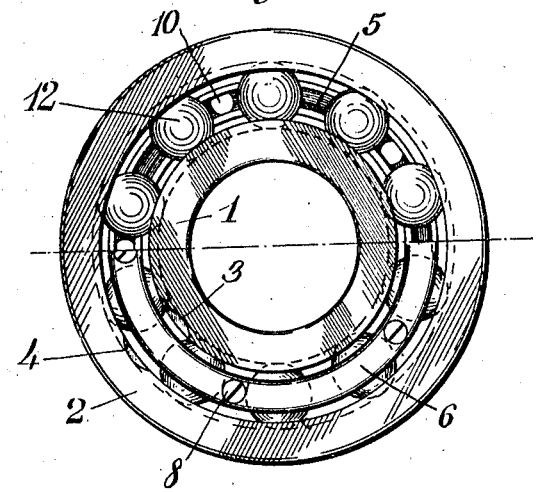
Figure 2:
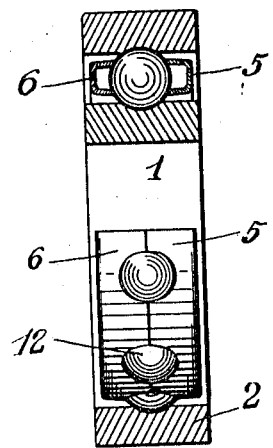
Figure 3:
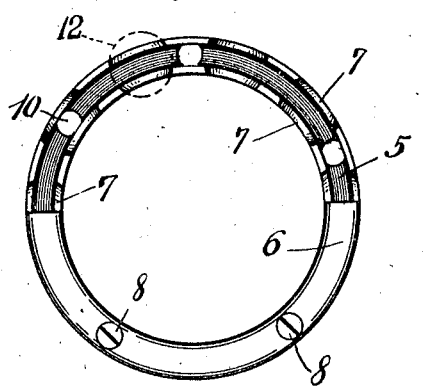
Figure 4:
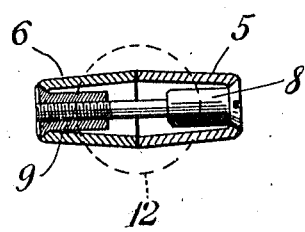

Figure 1 represents an elevation with one of the ball spacing retaining rings partially cut away; Fig. 2 is a cross section partly in perspective; Fig. 3 shows the spacing retaining rings, one ring being partially cut away; and Fig. 4 is a cross section showing on an enlarged scale the manner of securing the rings together.

1, 2 represent inner and outer ball races having grooves therein in which the balls run, and also respectively notches 3 and 4 which, when brought in registry with each other, permit the balls to be inserted between the two rings and locked when the notches are moved out of registry with each other. It may happen accidentally in practice that the notches between the two rings come in registry with each other, and, furthermore, it is desirable to provide a spacing and retaining ring whereby the balls may be equally spaced peripherally around the inner race, as thereby the bearing operates with less friction and the balls wear more evenly. Furthermore, it is desirable to provide a construction of spacing and retaining ring which will be of sufficient strength and cheaply constructed, and which will also have spaces wherein lubricant will be retained so that the actual bearing surfaces will be supplied with lubricant. In order to carry out these objects of the invention, I have provided a spacing retaining ring construction as shown in Figs. 3 and 4, consisting of two U-shaped rings 5, 6 preferably formed of stamped metal and provided with equi-distant ball spacing notches 7, and adapted to be secured together by headed screws 8 threading into headed nuts 9, these screws 8 being passed through holes 10 in the rings and thereby equally spacing the balls 12.

It will be seen that the halves of the spacing ring are substantially alike and can be made by stamping from sheet metal, and when placed end to end to form the complete ring, a large cavity on each side of the balls is provided in which grease will be maintained and supplied to the ball surfaces as required. In case it is desired to inspect the balls, the ring can readily be taken apart without disassembling the entire bearing and equally readily reassembled. In case it is desired to disassemble the entire bearing, this will be done by first taking the ring apart, then bringing the notches into register and removing the balls one by one.

It will be understood that other ways of inserting the balls may be used than the arrangement of notches, but the arrangement of notches has advantages in that it permits the use of a larger number of balls, and where the rings are not notched or otherwise provided with apertures for the insertion of the balls.

The invention is not to be restricted to the precise construction and arrangement herein shown, since various forms of hollow separable spacing rings may be provided without departing from the invention.

Having thus described my invention, I declare that what I claim as new and desire to secure by Letters Patent, is,—

As an article of manufacture, a ball bearing comprising bearing rings having grooves forming a raceway, balls in said raceway, and means disposed between said bearing rings for maintaining separation of said balls and serving as a lubricant container, said means comprising two U-shaped channeled rings having registering notches forming pockets to contain said balls, the channels intermediate said balls forming lubricant containing recesses opening into said pockets, said rings being in contact with said balls at the sides of said pockets, and fastenings for connecting and holding said rings together.

In testimony whereof I affix my signature, in presence of two witnesses.

GUSTAVO VINCON.

Witnesses:
J. S. JOSEPHS,
LOUIS ALLEN.

Copies of this patent may be obtained for five cents each, by addressing the "Commissioner of Patents, Washington, D. C."